Sept. 20, 1938.                M. KRAMER                 2,130,958
                          LANDING FLAP ON AIRCRAFT
                            Filed July 24, 1937
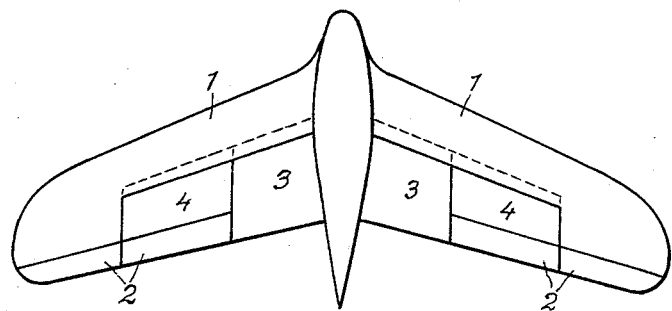
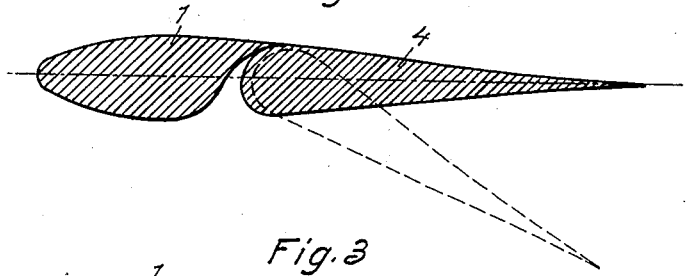
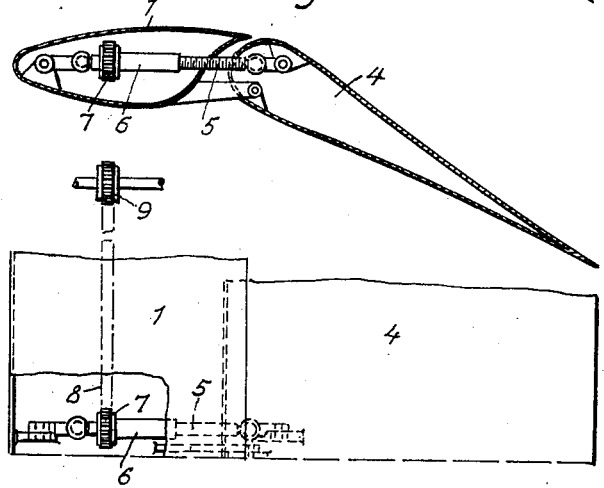
Inventor:
MAX KRAMER
BY HIS ATTORNEYS
Howson and Howson Patented Sept. 20, 1938

2,130,958

UNITED STATES PATENT OFFICE 2,130,958

LANDING FLAP ON AIRCRAFT

Max Kramer, Berlin Adlershof, Germany

Application July 24, 1937, Serial No. 155,544
In Germany July 27, 1936

7 Claims. (Cl. 244—42)

It is known that the aerodynamic efficiency of normal aircraft can be considerably augmented by the use of landing flaps. The landing flaps ordinarily used at the present time have a chord amounting to about 20% of the chord of the complete wing section or profile, in which they are incorporated. They extend over about 50 to 100% of the span and have been arranged both with and without a slot in front of the landing flap.

In tail-less aircraft with arrow-shaped wings the application of the ordinary present day landing flaps is beset with difficulties. On the one hand such landing flaps, when operated, produce a large moment of head load which can only be counterbalanced by using the wing tip elevators commonly found in tail-less machines but this entails loss of maximum lift. On the other hand, a considerable length of span is already taken up by the elevators and is not available for the application of the landing flaps. For these reasons only trifling increases in efficiency can be obtained by using the known landing flaps aforesaid.

The present invention relates to an improved arrangement of landing flaps which enables an effective increase of maximum lift to be obtained, particularly in tail-less aircraft with arrow-shaped wings.

In the drawing:

Fig. 1 is a plan view of an aircraft embodying the invention.

Fig. 2 is a detail view showing the relation of flap to the fixed wing parts and Figs. 3 and 4 are detail views of the flap operating mechanism.

Fig. 1 of the accompanying drawing shows a constructional example of the idea on which this invention is based. The wings 1 of the tail-less aeroplane depicted are of arrow-shape (known per se) and have the combined ailerons and elevators 2 usual in aircraft of this kind. According to the invention, landing flaps 3 and 4 of abnormally great chord measurement are arranged in the inner parts of the wing. This chord amounts to at least 30% of the chord of the selected wing profile and, in preferred forms of construction, to as much as 50 to 60% of the chord of the wing profile.

Preferably, the landing flaps are constructed as slot flaps (see Fig. 2) with slots that close when the flaps are in neutral position and are distributed over the wing span in the manner shown in Fig. 1. Preferably also the arrangement is such that when the landing flaps are deflected the deflection of the two inner flaps 3 is about twice as great as that of the two outer flaps 4. This differing angle of deflection can, for instance, be established by using positive gearing for deflecting the flaps.

One example of the ways in which this positive operation of the landing flaps can be effected is shown, in Fig. 3. To the landing flaps 4 is attached a screw-threaded spindle 5, upon which rides a nut 6. The said nut 6 is furnished with a chain wheel 7 with which is engaged a driving chain 8 which also engages a second chain wheel 9. The latter is associated with another nut, riding on another screw-threaded spindle attached to the corresponding landing flap 3. Using this arrangement, the ratios of transmission between the chain and two spindles can be so selected that the required ratio between the angles of deflection of flaps 3 and 4 is obtained. The chain can be moved in any desired manner through connections to an appropriate controlling lever, worked by the pilot.

The landing flap arrangement of this invention effectively increases the maximum lift of the wings. Such improvement results from the combination of a number of effects:

1. Special investigations have shown that landing flaps having a chord of about 50 to 60% of that of the wing profile yield fundamentally, a higher maximum lift than landing flaps of the shorter chord measurement usual at the present time.

2. Landing flaps dimensioned to about 50 to 60% of the wing chord can be arranged over any desired area of the span, as they do not reduce the width of span available for the combined ailerons and elevators common in tail-less aircraft. Extending the landing flaps over a large width of span, however, also enables the maximum lift to be increased.

3. Landing flaps dimensioned to about 50 to 60% of the wing chord yield, for the same flap angle, a smaller head loading moment than landing flaps of the usual chord dimension. Since, in tail-less aircraft, the counterbalancing of moments of head load by the elevators is attended by an appreciable loss in maximum lift, the lessening of the moment of head load due to the landing flaps means an increase in maximum lift.

4. Landing flaps dimensioned to about 50 to 60% of the wing chord produce, for the same flap angle, a greater aerodynamic increase of the angle of incidence at the parts of the wings fitted with these flaps than do landing flaps of the usual chord dimension. If the landing flaps be arranged, according to the illustrated example, in such a way that the landing flap angle attains a maximum at the inner parts of the wing but is zero at the outer parts thereof, a negative warp is produced which, in arrow-shaped wings, sets up a moment of tail load. With a flap chord of from 50 to 60% of the wing chord and an equal flap angle this tail loading moment is greater than the corresponding tail loading moment obtained with ordinary landing flaps because the wing warp is greater.

Thus the compensation or counter-balancing of the head loading moment (mentioned under heading 3) can easily be effected without detriment to the maximum lift values.

Although, in the drawing and in the accompanying description, the important features of the invention are disclosed only in connection with the application thereof to a tail-less aeroplane with arrow-shaped wings, it is to be remarked that the combination of features which consists in making landing flaps with a chord dimension amounting to 50 to 60% of the chord of the selected wing profile as a whole and, at the same time, constructing them as slot flaps can advantageously be applied to ordinary aircraft.

What I claim is:—

1. A tail-less aircraft, including wings having slotted landing flaps at the inner part of each wing, said flaps having a chord dimension of about 50% to 60% of the wing profile, in combination with means for closing the slot in neutral position.

2. A tail-less aircraft, including wings having a plurality of slotted landing flaps at the inner part of each wing, having a chord greater than 50% of the wing chord, in combination with means for closing the slot in neutral position.

3. A tail-less aircraft, including wings with a plurality of slotted landing flaps at the inner part of each wing, having a chord greater than 50% of the wing chord, in combination with means for closing the slot in neutral position, and means for deflecting the several flaps through differing angles which decrease in magnitude from the inner parts of the wings toward the wing tips.

4. A tail-less airplane having a landing flap arrangement in the wings thereof characterized by at least two landing flaps arranged in each wing, each flap having a chord dimension of about 50 to 60% of the wing profile, and by means for positively deflecting the several flaps through differing angles which decrease gradually in magnitude from the inner parts of the wings towards the wing tips, the angle of deflection of the inner landing flaps being about twice as great as the angle of deflection of the outer ones.

5. A tail-less airplane including a flap arrangement in the wings, characterized by a plurality of landing flaps arranged in a wing having a chord dimension of about 50 to 60% of the wing profile and by means for positively deflecting the several flaps through differing angles which decrease gradually in magnitude from the inner parts of the wings towards the wing tips.

6. A tail-less airplane including a landing flap arrangement characterized by a plurality of landing flaps arranged in a wing and by means for positively deflecting the several flaps through differing angles which decrease gradually in magnitude from the inner parts of the wings towards the wing tips, the angle of deflection of the inner landing flaps being about twice as great as the angle of deflection of the outer ones.

7. A tail-less aircraft including, wings with slotted landing flaps with a chord dimension of about 50 to 60% of the wing profile in combination with means for holding each undeflected flap adjacent the wing, and means for spacing the deflected flaps from the wing, and means for deflecting the several flaps on each wing through differing angles which decrease in magnitude from the fuselage toward the wing tip.

MAX KRAMER.